(12) United States Patent
Goldman et al.

(10) Patent No.: US 11,649,071 B2
(45) Date of Patent: May 16, 2023

(54) THRUST VECTOR CONTROL MECHANISM

(71) Applicant: ExoTerra Resource, LLC, Littleton, CO (US)

(72) Inventors: Elliot Goldman, Centennial, CO (US); Jason Gordon, Aurora, CO (US); Nathan Rosenblad, Winterpark, FL (US); Chris Thein, Moss Beach, CA (US)

(73) Assignee: EXOTERRA RESOURCE, LLC, Littleton, CO (US)

( * ) Notice: Subject to any disclaimer, the term of this patent is extended or adjusted under 35 U.S.C. 154(b) by 403 days.

(21) Appl. No.: 16/844,628

(22) Filed: Apr. 9, 2020

(65) Prior Publication Data

US 2020/0377238 A1    Dec. 3, 2020

Related U.S. Application Data

(60) Provisional application No. 62/833,451, filed on Apr. 12, 2019.

(51) Int. Cl.
    *B64G 1/40*        (2006.01)

(52) U.S. Cl.
    CPC .................. *B64G 1/405* (2013.01)

(58) Field of Classification Search
    CPC .......... B64G 1/405; B64G 1/40; B64G 1/242; B64G 1/26; B64G 1/24; B64G 1/244; B64G 1/401; B64G 1/409; F02K 9/80; F02K 1/002; F02K 1/15; F02K 1/805; F02K 1/008; F03H 1/0037; F03H 1/0093; F03H 1/0087; F03H 1/0006; B64C 27/52; B64C 15/00; B64C 30/00; B64D 15/16

USPC ......... 73/488, 583; 244/12.1, 12.4, 39, 75.1, 244/76 R; 701/1–4, 14, 301; 702/142–145, 151–152

See application file for complete search history.

(56) References Cited

U.S. PATENT DOCUMENTS

| | | | |
|---|---|---|---|
| 3,652,042 A * | 3/1972 | Welther | B64G 1/007 244/173.3 |
| 4,274,610 A | 6/1981 | Bastian | |
| 4,844,380 A * | 7/1989 | Peoples | F42B 15/36 244/58 |
| 5,630,564 A * | 5/1997 | Speicher | F42B 10/663 244/3.29 |
| 5,738,308 A * | 4/1998 | Haag | B64G 1/26 244/54 |
| 5,887,821 A | 3/1999 | Voigt et al. | |
| 6,105,901 A | 8/2000 | Uianoski | |
| 7,518,085 B1 * | 4/2009 | Krishnan | H05H 1/54 219/121.48 |
| 2003/0178525 A1 | 9/2003 | Ramer et al. | |

(Continued)

FOREIGN PATENT DOCUMENTS

| | | | | |
|---|---|---|---|---|
| CN | 107839900 A * | 3/2018 | | B64G 1/10 |
| EP | 780298 A1 * | 6/1997 | | B64G 1/26 |
| WO | WO-2018026786 A1 * | 2/2018 | | B64G 1/40 |

*Primary Examiner* — Jeffrey P Aiello
(74) *Attorney, Agent, or Firm* — Sheridan Ross P.C.

(57) ABSTRACT

The present disclosure relates generally to thrust vector control mechanisms. Mechanisms are provided comprising support and attachment members for securing a thruster or other object to an additional object and wherein the thruster or object is provided with freedom of movement. At least one motor is provided to control movement and positioning of a thruster or similar object.

20 Claims, 12 Drawing Sheets

(56) References Cited

U.S. PATENT DOCUMENTS

2008/0203216 A1* 8/2008 Apeloig ............... B64C 35/003
                                                      244/3.1
2021/0262455 A1* 8/2021 Hummelt ............. F03H 1/0093

* cited by examiner

THRUST VECTOR CONTROL MECHANISM

This U.S. Non-Provisional Patent Application claims the benefit of priority from U.S. Provisional Patent Application 62/833,451 filed Apr. 12, 2019, the entire disclosure of which is hereby incorporated by reference for all purposes.

FIELD

The present disclosure relates generally to methods, systems and devices for controlling and manipulating the position of a thruster and a force vector associated with a thruster. Although various embodiments of the present disclosure relate to control mechanisms for use with thrusters and propulsion systems, methods and devices of the present disclosure are not limited to particular uses or combination of features.

BACKGROUND

Thrusters are useful in various applications including, for example, spaceflight and defense applications. The force vector that results from the direction and magnitude of force provided by a thruster can be modified in various different ways including, for example, selective positioning of the thruster and/or control of expelled gas from the thruster. Various known devices and methods, however, provide complex devices with significant disadvantages including increased weight and limited freedom of movement.

SUMMARY

Accordingly, there has been a long-felt and unmet need to provide a system that is operable to extend and retract a thruster axially relative to a body (e.g. a spacecraft chassis) between a stowed position and a deployed position. There further exists a need to provide a mechanism that is capable of and operable to adjust and change at least an angle or direction of a thrust vector created by a thruster and relative to a body (e.g. a spacecraft chassis). There additionally exists a need to provide a system that is capable of and operable to laterally translate a thruster or similar object. Embodiments of the present disclosure provide methods, systems and devices that provide systems and methods satisfying the aforementioned needs.

Although embodiments of the present disclosure contemplate use and provision with various spaceflight technologies, including electrostatic ion thrusters, embodiments and inventions of the present disclosure are not limited to any specific use or application. For example, embodiments of the present disclosure are contemplated as being provided with other known thrusters such as electromagnetic plasma thrusters, various marine and under-water thrusters, and other devices that may or may not be related to spaceflight (e.g. lighting elements). It will be understood that novel aspects of the present disclosure are embodied by devices and systems disclosed herein regardless of their intended or actual use.

In various embodiments, control mechanisms are provided that comprise a plurality of curved arms or support members. First ends of the curved arms are in communication with an actuator, which is contemplated as comprising a piezoelectric motor in certain embodiments. Second ends of the curved arms are rotatably connected to a thruster or thruster-receiving member. In some embodiments, the rotatable connections comprise spherical bearings that allow for rotation in multiple axes. Collectively, the plurality of curved arms and rotatable connections allow for freedom of movement of the thruster wherein the thruster is moveable axially, laterally, and wherein the thruster is rotatable about various axes as shown and described herein. Devices of the present disclosure allow a thruster to deploy (i.e. extend axially), retract (i.e. withdraw axially), translate laterally, and to rotate.

In various embodiments, at least one actuator is provided in communication with at least one arm or support member and wherein the system comprises a gear train or gearing system. For example, in some embodiments, a beveled gearset is provided and is attached to a motor (e.g. stepper motor). The beveled gearset is contemplated as comprising, for example, a 26 tooth, 20 thread-per-inch driven gear with a 13-tooth driving pinion. The gearing system thus provides a mechanical advantage and a 2:1 gear reduction between the motor and the driven gear/arm. Other gearing combinations and ratios are contemplated.

In some embodiments, systems of the present disclosure comprise a planetary gear train and a 90-degree gearhead attached to a stepper motor (for example) to provide gear reductions between approximately 2:1 and 500:1. Accordingly, in various embodiments, the actual displacement of a support arm caused by and resulting from an actuation or movement of a corresponding motor is contemplated as being variable and controllable at least through the provision of a desired gear train or gear combination between the motor and the arm.

In one embodiment, a thrust vector control mechanism is provided that comprises a plurality of support arms. Each of the plurality of support arms comprises a first end and a second end. An actuator is provided in communication with at least one and preferably each of the plurality of support arms. A spherical bearing assembly is provided at or proximal to the second end of each of the plurality of support arms and a thruster body is connected to the support arms. Each of the plurality of support arms are in communication with the thruster body, and the thruster body is rotatable relative to each of the support arms and translatable relative to the actuator.

In some embodiments, a controller is provided in communication with the actuator(s) of the mechanism, and wherein the controller is operable to send and receive signals to and from the actuator(s) related to the position of the thruster.

Actuators and motors of the present disclosure are contemplated as comprising specifications to hold and withstand loads applied during launches and general operation of a thruster. One of ordinary skill in the art will recognize that these loads and required specifications for motors will vary based on a particular application and thruster size, for example. In various embodiments, motors with at least 3.5 Newton-meters of torque are provided. In some embodiments, at least one actuator provided in combination with a mechanism comprises a U-622 piezoelectric motor with a torque rating of 5 Newton-meters, 525 µrad resolution, a weight of 120 g and a built-in encoder. In other embodiments, at least one UPM-20 piezoelectric motor with a torque rating of 100 Newton-meters, 5 µrad resolution, a weight of 40 g and a built-in encoder is provided. In some embodiments, at least one stepper motor with 480 Newton-meters of torque and 400 steps/revolution is provided.

In various embodiments, methods of controlling a thruster are provided. Methods of the present disclosure contemplate providing a mechanism as shown and described herein and providing signals to the actuator to effect an intended movement of the thruster.

In various embodiments, thrust vector control mechanisms of the present disclosure are secured to at least one of a motor and a thruster by a locking threaded feature (e.g. a KEENSERT™). Various propellant gas plumbing features and connections are contemplated. For example, in some embodiments, a flexible tubing is provided to transmit propellant from a source (e.g. spacecraft chassis) to a thruster. In some embodiments, KALREZ™ flexible tubing is provided that comprises an inner diameter of 0.13" and an outer diameter of 0.24" to provide the required propellant flow rates.

In various embodiments, mechanisms of the present disclosure comprise thermal management features. In some embodiments, a thermal strap is provided to reject heat from the thruster and reduce temperature(s) of the mechanism. Thermal straps of the present disclosure comprise very high thermal conductivity and provide minimal stiffness due to thrust vector control motor constraints. Materials contemplated for use with thermal straps of the present disclosure comprise copper members (e.g. copper ropes) and graphite (e.g. foils) due to their high conductivity ease of mobility.

In some embodiments, at least one biasing member is provided with thrust vector control mechanisms of the present disclosure. For example, in some embodiments, at least one torsional spring is provided in combination with the support arms shown and described herein to bias the support arm radially outwardly, and to bias a thruster toward a center or centered position. In some embodiments, the support arms themselves comprise flexural elements with a memory or elastic restoring force. In other embodiments, one or more coil springs are provided to bias one or more of the support arms toward a centered or neutral position.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

Embodiments of the present disclosure have significant benefits across a broad spectrum of endeavors. It is the Applicant's intent that this specification be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity so as to not confuse the reader, and it is not intended that such claim term by limited, by implication or otherwise, to that single meaning.

Figure 1:
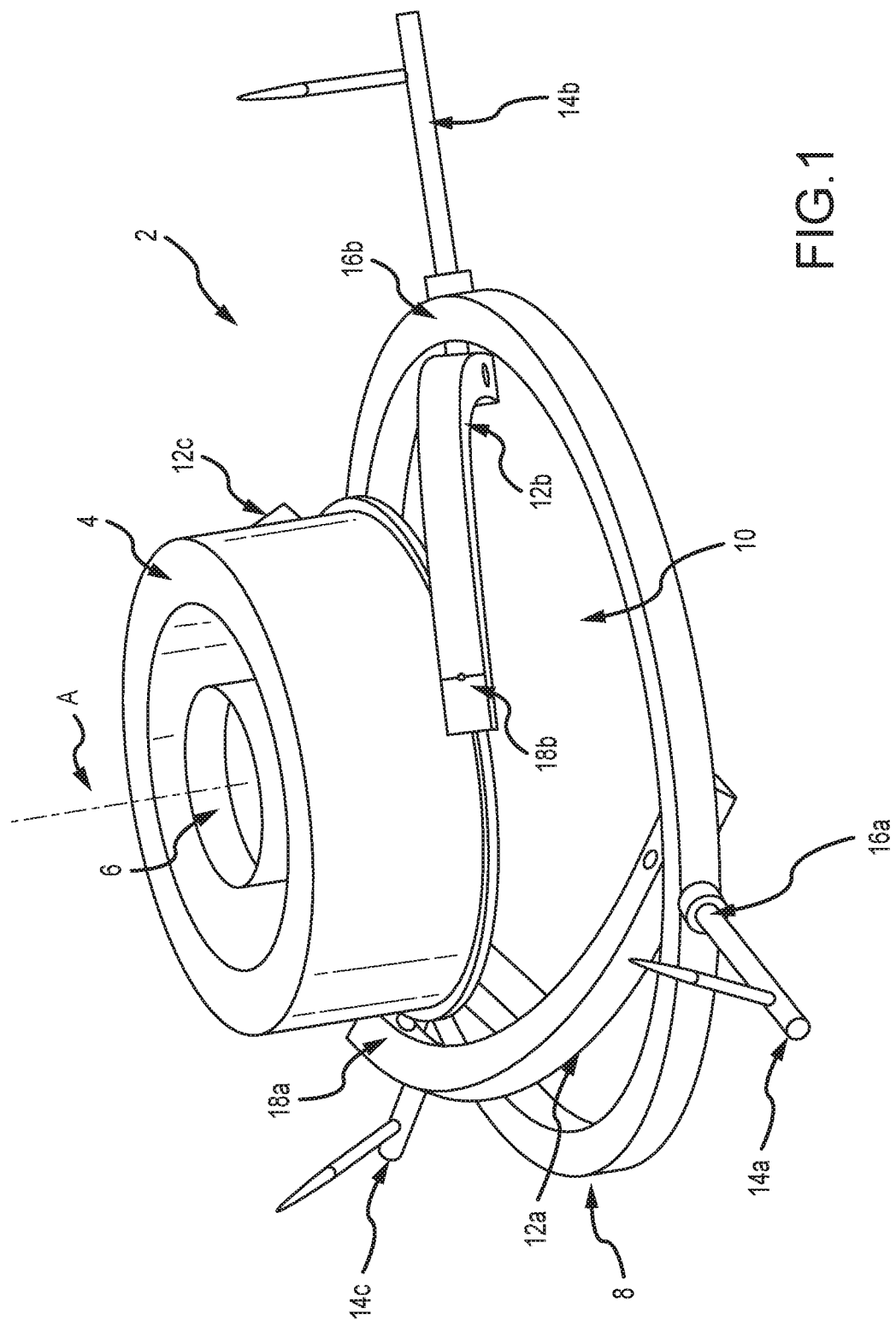
FIG. 1 is a perspective view of a thrust vector control mechanism according to one embodiment of the present disclosure.

FIG. 1 is a perspective view of a thrust vector control mechanism 2 according to one embodiment of the present disclosure. As shown, the mechanism 2 comprises a thruster with a thruster body 4, a magnet core 6 and various components to allow for freedom of movement of the thruster body. In some embodiments, the thruster comprises an electrostatic ion thruster. Mechanisms of the present disclosure, however, are not limited for use with any particular thruster or for use with thrusters generally. It is contemplated, for example, that mechanisms and linkages of the present disclosure are provided with or useful with lighting elements, camera equipment, robotics, and any number of devices requiring or benefiting from the freedom of movement provided by embodiments of the present disclosure.

The mechanism of FIG. 1 comprises a frame member 8, which is depicted as a circular frame member in FIG. 1. The frame member 8 at least partially defines a void space 10 in which a central body member 4 is provided and allowed to move as shown and described herein. The central body member is shown as a thruster 4 in FIG. 1, but is contemplated as comprises various features and components in alternative embodiments. The thruster 4 is secured to the frame member 8 by a plurality of rotatable arms 12a, 12b, 12c. In the embodiment shown in FIG. 1, the rotatable arms 12 comprise curved, rotatable support arms for the thruster 4. The rotatable arms are particularly well suited to support, receive, and manipulate a thruster with a substantially circular or cylindrical shape. It is further contemplated, however, that arms 12 of the present disclosure comprise various different shapes including, for example, straight and angled arms.

As further shown in FIG. 1, each of the rotatable arms 12a, 12b, 12c comprises an axle member 14a, 14b, 14c and a rotation point 16a, 16b, 16c. The arms 12 and axle members 14 are each rotatable relative to the frame 8 about an axis. The rotatable arms 12a, 12b, 12c are rotatable relative to the frame member at or proximal to a first end of the rotatable arms. The second ends of the rotatable arms 12a, 12b, 12c are provided proximal to the thruster body 4. Spherical bearing members 18a, 18b, 18c are provided proximal to the second ends of the arms and the thruster body 4 is rotatable relative to the second ends of the arms 12 about the bearing members 18a, 18b, 18c. The thruster body 4 is further rotatable and moveable relative to the frame 8 through rotation of the arms 12 about the rotation points 16 and/or the spherical bearing members 18. The thruster body 4 of FIG. 1 is shown in a deployed state, wherein the thruster body 4 is translated along an axis A outwardly from the frame 8 and any associated object (e.g. spacecraft chassis). The orientation of the axis A and a thrust vector of the thruster can be altered by rotating at least one of the rotatable arms 12a, 12b, 12c by a greater degree than at least one additional arm. For example, if one or two arms 12a, 12b are rotated about their respective rotation point 16 and a third rotatable arm 12 is not caused to rotate, the angular position of the thruster and the axis A relative to the frame 8 will be varied.

In various embodiments, each of the rotatable arms 12a, 12b, 12c are in communication with an actuator (not shown in FIG. 1). For example, in some embodiments, an electric motor is contemplated as being provided in communication with each of the three rotatable arms 12a, 12b, 12c of the device 2 shown in FIG. 1. Electric motors for use with embodiments of the present disclosure comprise, for example, piezoelectric motors and stepper motors. Actuators of the present disclosure are contemplated as being secured to or in communication with axles 14a, 14b, 14c such that a rotation of the arms 12 is accomplished by an actuator rotating the axle 14. Actuators are contemplated as being provided external to the frame 8. In some embodiments, however, the actuator(s) is provided internally of the frame 8.

Figure 2:
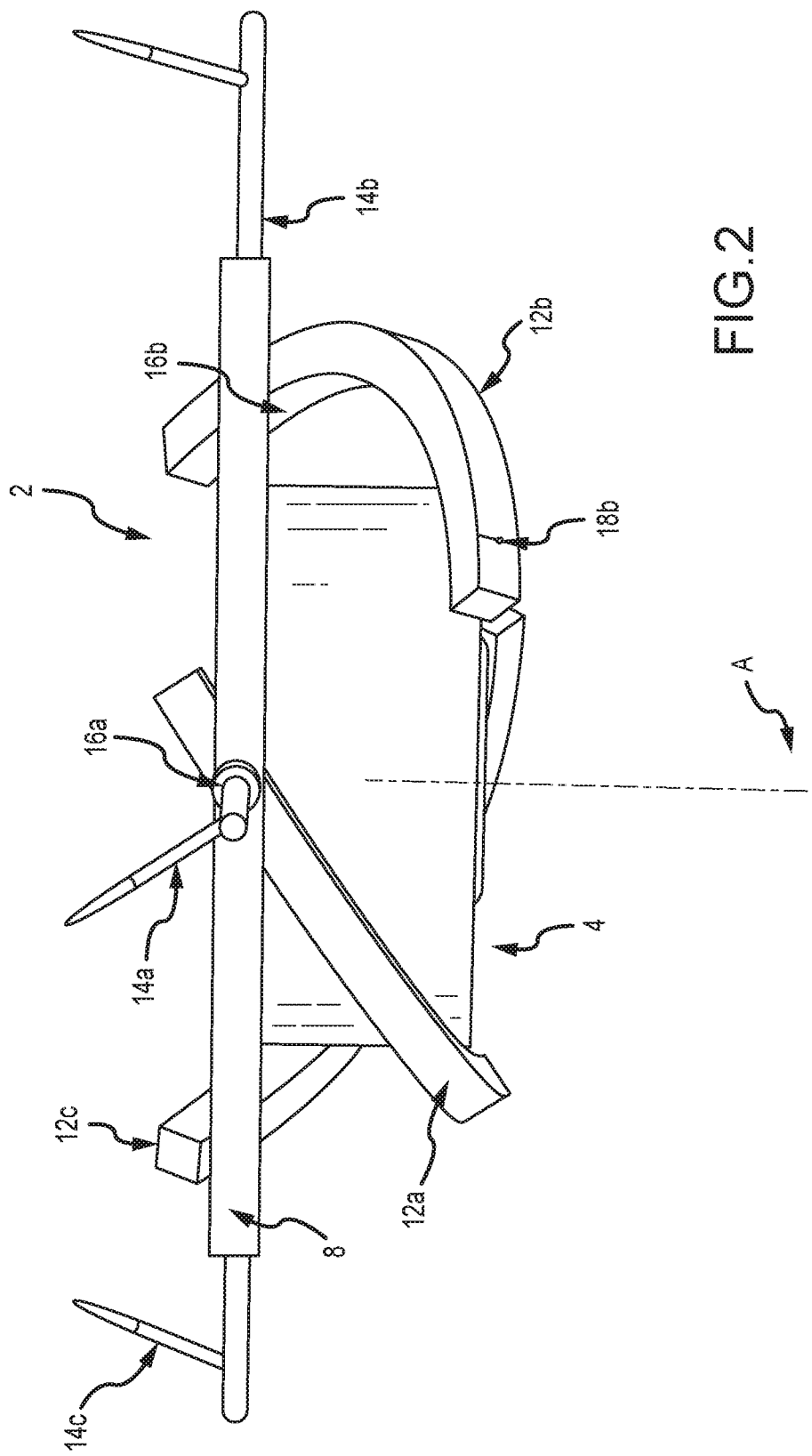
FIG. 2 is a front elevation view of a thrust vector control mechanism according to the embodiment of FIG. 1.

FIG. 2 is an elevation view of the mechanism 2 of the embodiment of FIG. 1. Various components shown and described with respect to FIG. 1 are also shown in FIG. 2, and the discussion of those elements in FIG. 1 is incorporated by reference. FIG. 2 illustrates the thruster body 4 in a retracted position. Each of the three arms 12a, 12b, 12c have been rotated about their respective rotation points 16 such that the thruster body 4 has been translated along axis A relative to at least the frame 8. The arms 12 have been rotated in equal amounts relative to each other to cause a translation of the body 4 without a rotation (i.e. the central axis A is substantially the same as that shown in FIG. 1).

Figure 3:
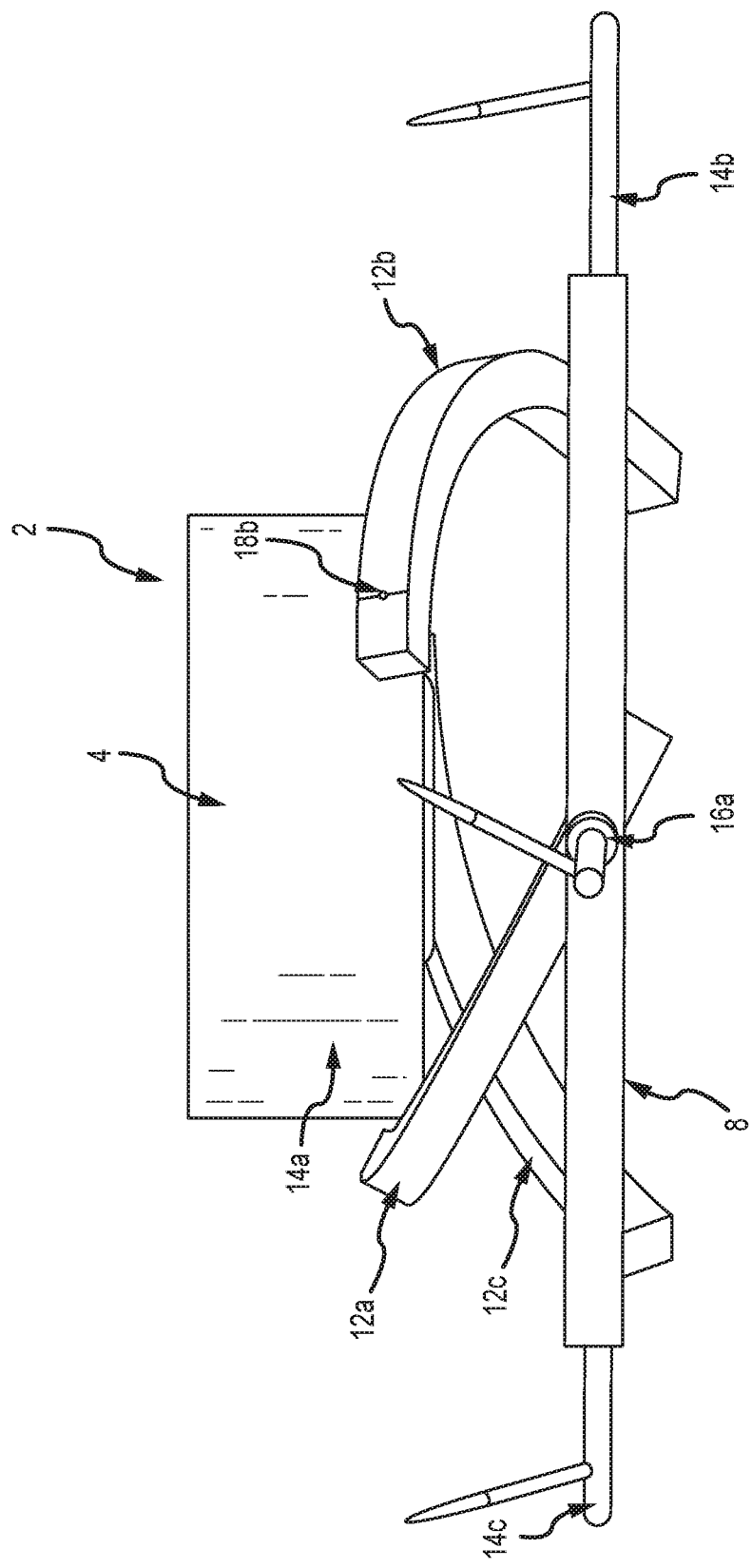
FIG. 3 is a front elevation view of a thrust vector control mechanism according to the embodiment of FIG. 1.

FIG. 3 is an elevation view of the mechanism 2 of the embodiment of FIG. 1. Various components shown and described with respect to FIG. 1 are also shown in FIG. 3, and the discussion of those elements in FIG. 1 is incorporated by reference. FIG. 3 illustrates the thruster body 4 in an extended position, as is also shown in FIG. 1. The rotatable arms 12 have each been rotated by substantially the same amount to achieve an exclusively linear translation of the thruster body from the retracted position shown in FIG. 2 (for example).

Figure 4:
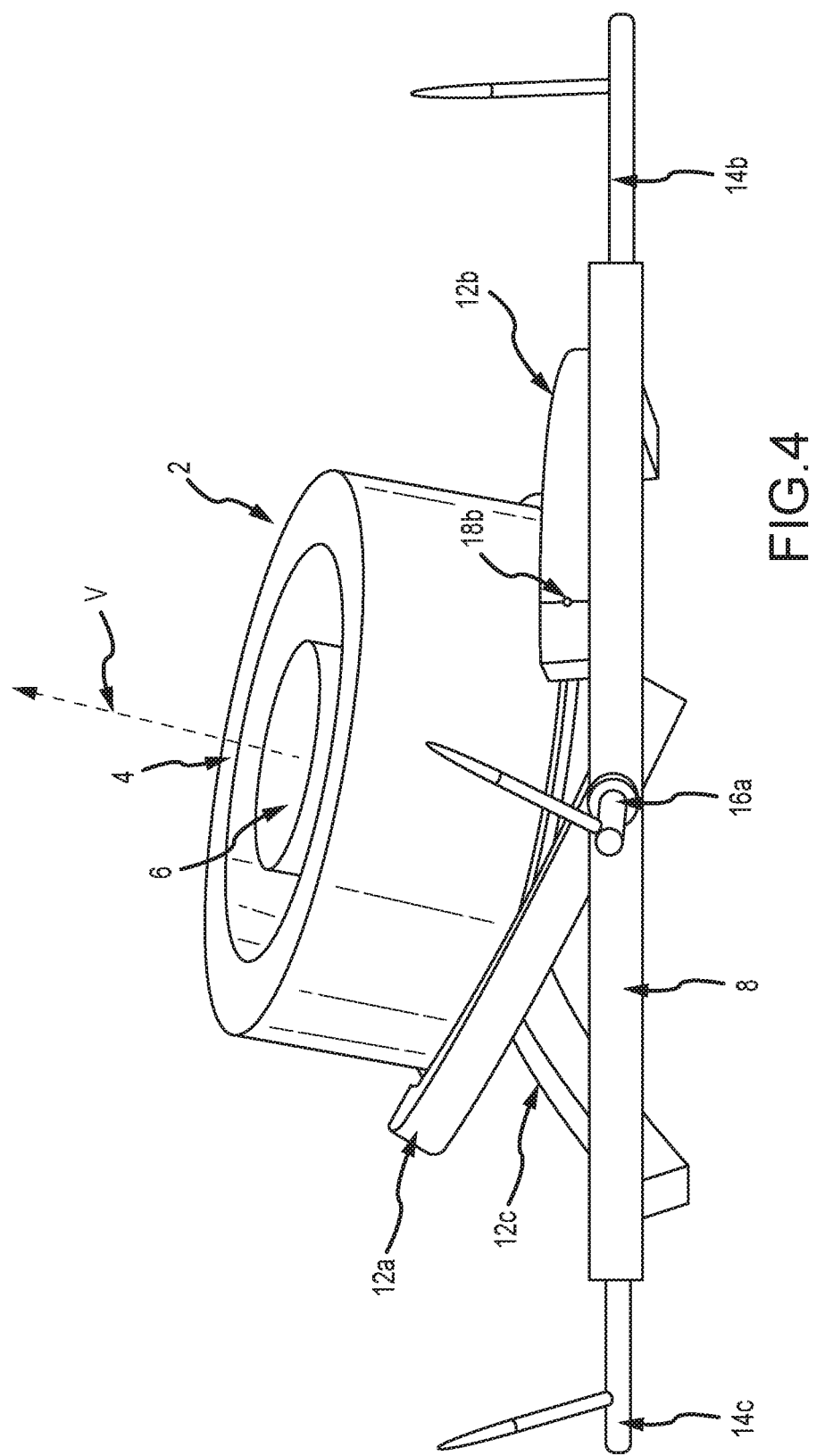
FIG. 4 is a front elevation view of a thrust vector control mechanism according to the embodiment of FIG. 1.

FIG. 4 is an elevation view of the mechanism 2 according to the embodiment of FIG. 1. As shown in FIG. 4, the thruster body 4 is provided in an extended position relative to the frame 8. The thruster body 4 is also angled relative to at least the position shown in FIGS. 1 and 3. As shown, two rotatable arms 12a, 12c are provided in an extended position and wherein the first and third arms 12a, 12c are provided at substantially the same angle or offset relative to the frame. The second rotatable arm 12b is provided at a different angle or offset relative to the frame 8 as compared with the position of first and third arms 12a, 12c. The resulting position of the thruster body 4 and associated thrust vector V is therefore offset from that associated with FIG. 1 (for example). Embodiments of the present disclosure provide for a thruster body 4 and associated thrust vector V that is moveable in three dimensional space by the provision of the rotatable arms that are rotatable relative to the frame 8 about rotation points 16 and by the provision of spherical bearing elements 18 provided at a connection between the rotatable arms 12a, 12b, 12c and the thruster body 4.

Figure 5:
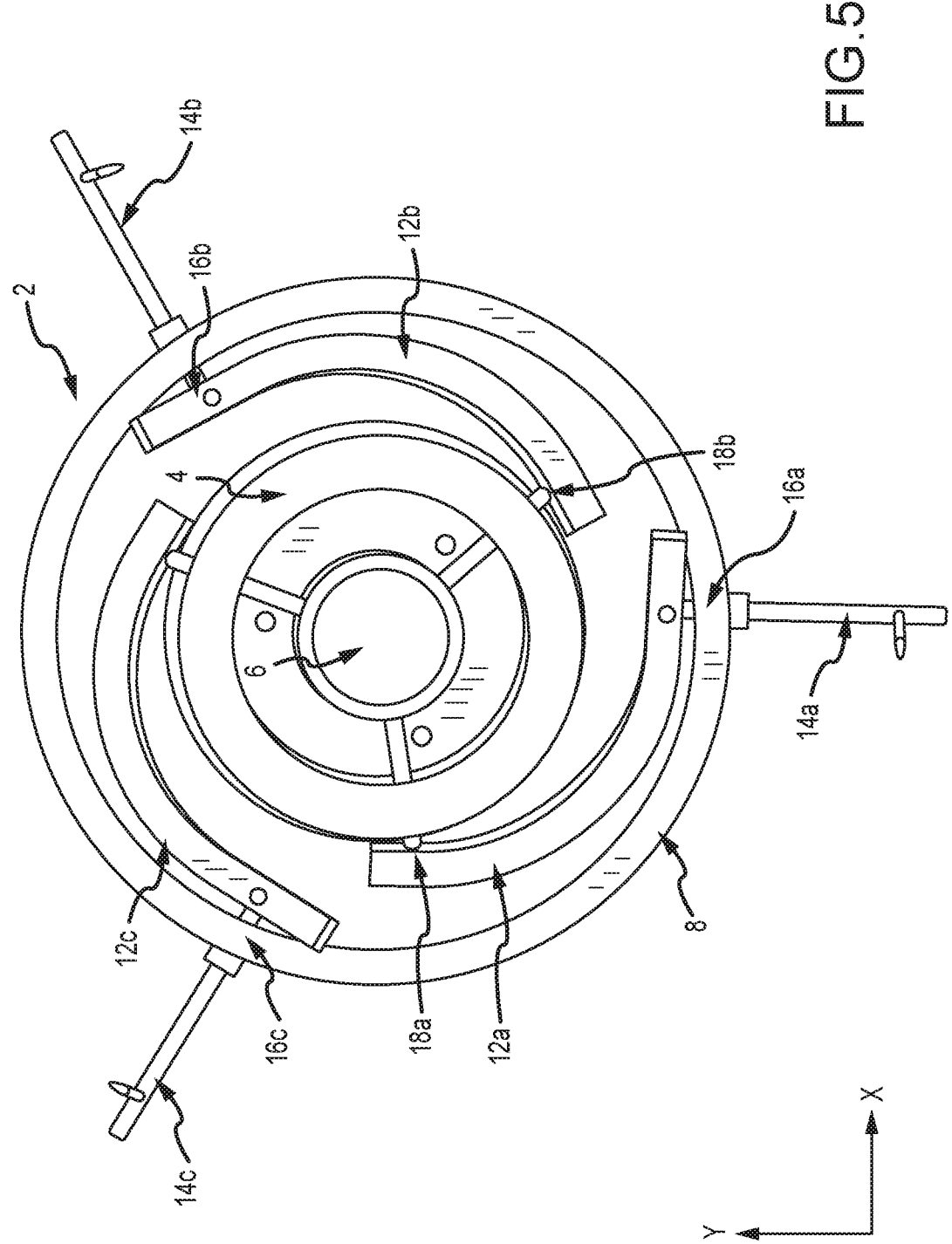
FIG. 5 is a top plan view is a front elevation view of a thrust vector control mechanism according to the embodiment of FIG. 1.

FIG. 5 is a top plan view of the thrust vector control mechanism 2 according to the embodiment of FIGS. 1-4. As shown, the mechanism comprises various components already shown and described. The support arms 12a, 12b, 12c of the depicted embodiment comprise rigid curved or curvilinear members with a bend of between 75 and 110 degrees. In some embodiments, the arms comprise a ninety-degree bend, wherein an axle 14 and a connection between the arm and the thruster body 4 are offset by ninety degrees (see offset between 16a and 18a, for example). The thruster body 4 of FIG. 5 is moveable in a two-dimensional X-Y plane as shown in FIG. 5. The thruster body 4 is also moveable in a third dimension along an axis (A of FIG. 1, for example). The thruster body 4 is further rotatable about the X and Y axes of FIG. 5 and the axis A of FIG. 1. The linkage of the mechanism 2 of FIGS. 1-5 therefore provides freedom of movement in translation and rotation. Movement of the thruster body 4 is accomplished by control of at least one actuator provided in communication with an axle and/or rotatable arm 18.

Figure 6:
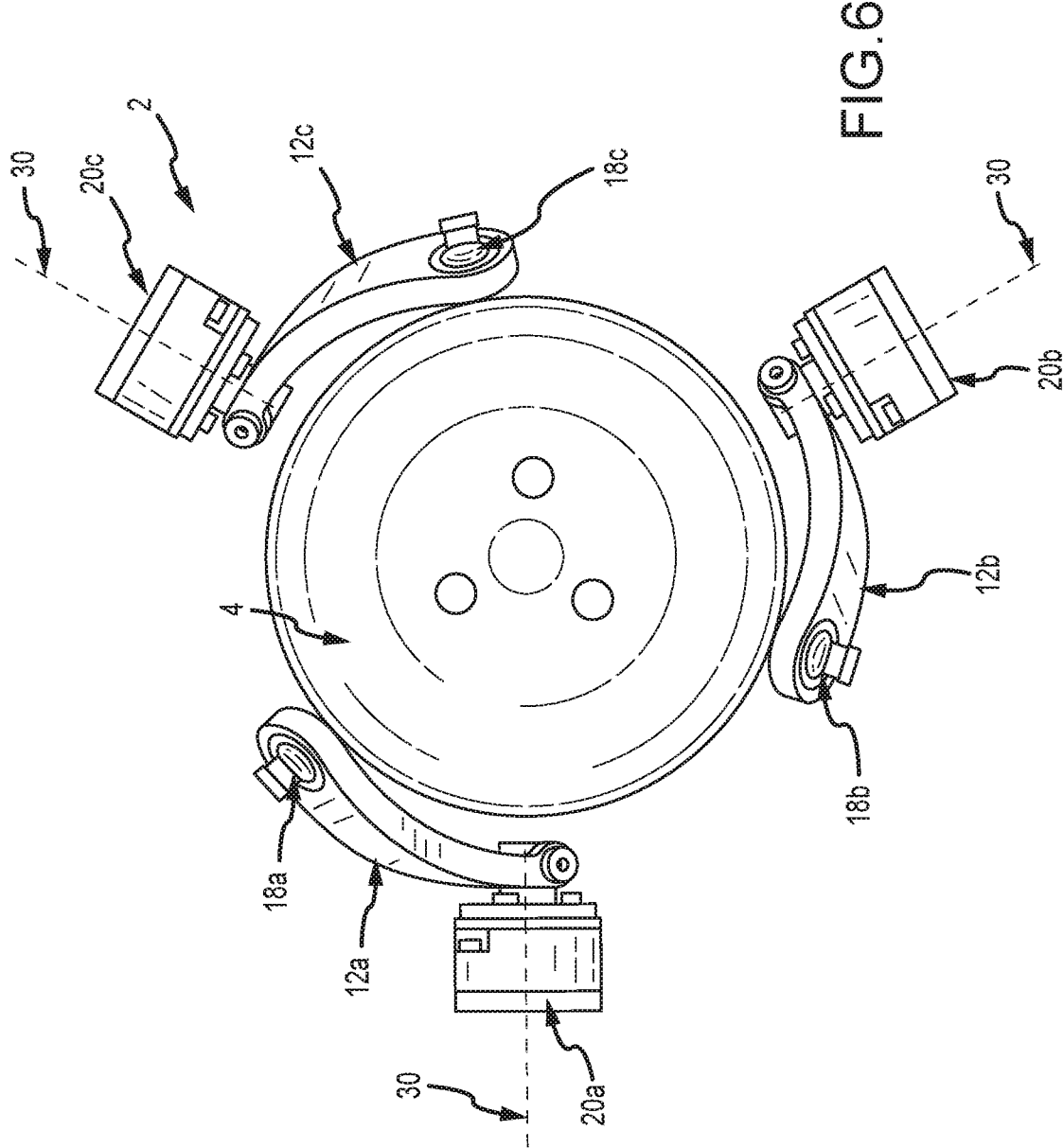
FIG. 6 is a top plan view of a thrust vector control mechanism according to one embodiment of the present disclosure.

FIG. 6 is a top plan view of a thrust vector control mechanism 2 according to one embodiment of the present disclosure. As shown, a thruster body 4 is provided in communication with a plurality of support arms 12a, 12b, 12c. In the depicted embodiment, three support arms are provided to allow for proper support and freedom of movement of the thruster body as shown and described herein. The mechanism 2 comprises a plurality of motors 20a, 20b, 20c to control movement and position of the thruster body 4. Each of the motors 20 are in force-transmitting communication with the support arms of the mechanism such that each support arm 20 is rotatable about an axis 30. Distal ends of the support arms 20 are connected to the thruster body 4 by hinge members 18a, 18b, 18c comprising spherical bearings. Activation of one or more of the motors 20 causes a movement of one or more support arms 12 and further causes at least one of a translation and a rotation of the thruster body 4, and a corresponding movement of a thrust vector generated by the thruster when the thruster is active. As one of ordinary skill in the art will recognize, the spherical bearings are operable to receive and transmit various different force vectors including tension and compression to cause movement of the thruster body based on a collective set of movements from the support arms 12.

Figure 7:
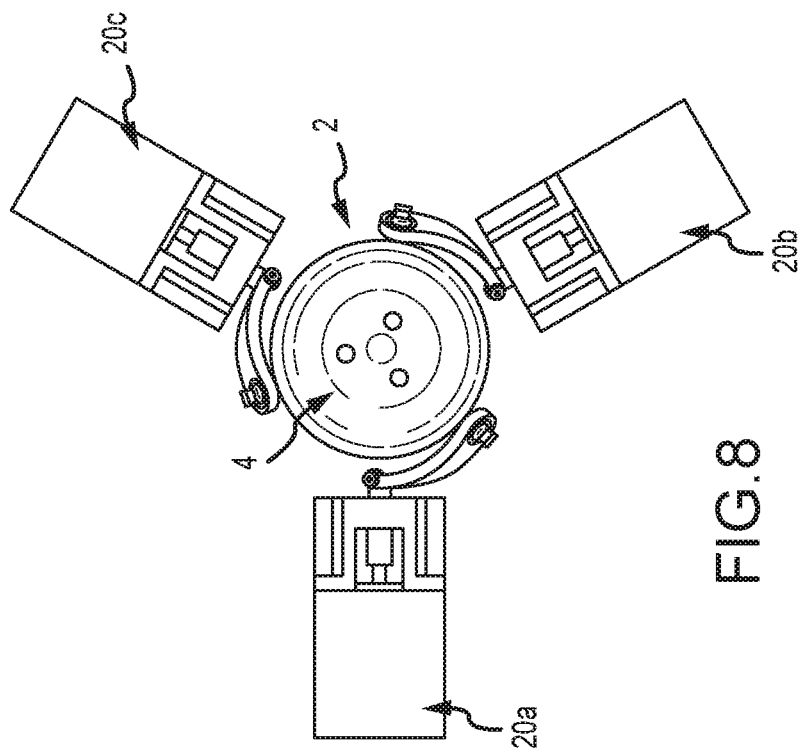
FIG. 7 is a top plan view of a thrust vector control mechanism according to one embodiment of the present disclosure.
Figure 8:
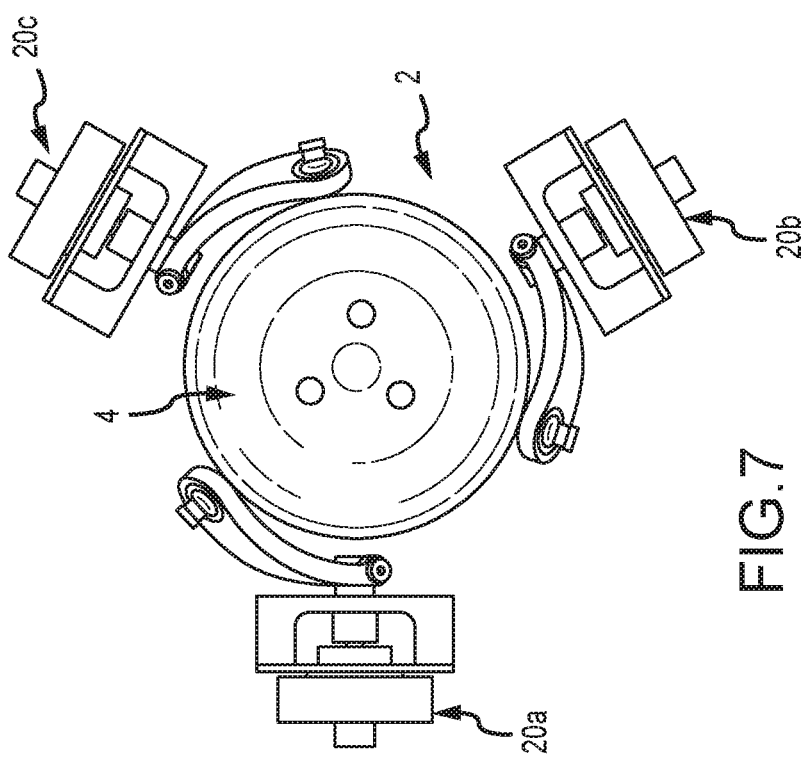
FIG. 8 is a top plan view of a thrust vector control mechanism according to one embodiment of the present disclosure.
Figure 9:
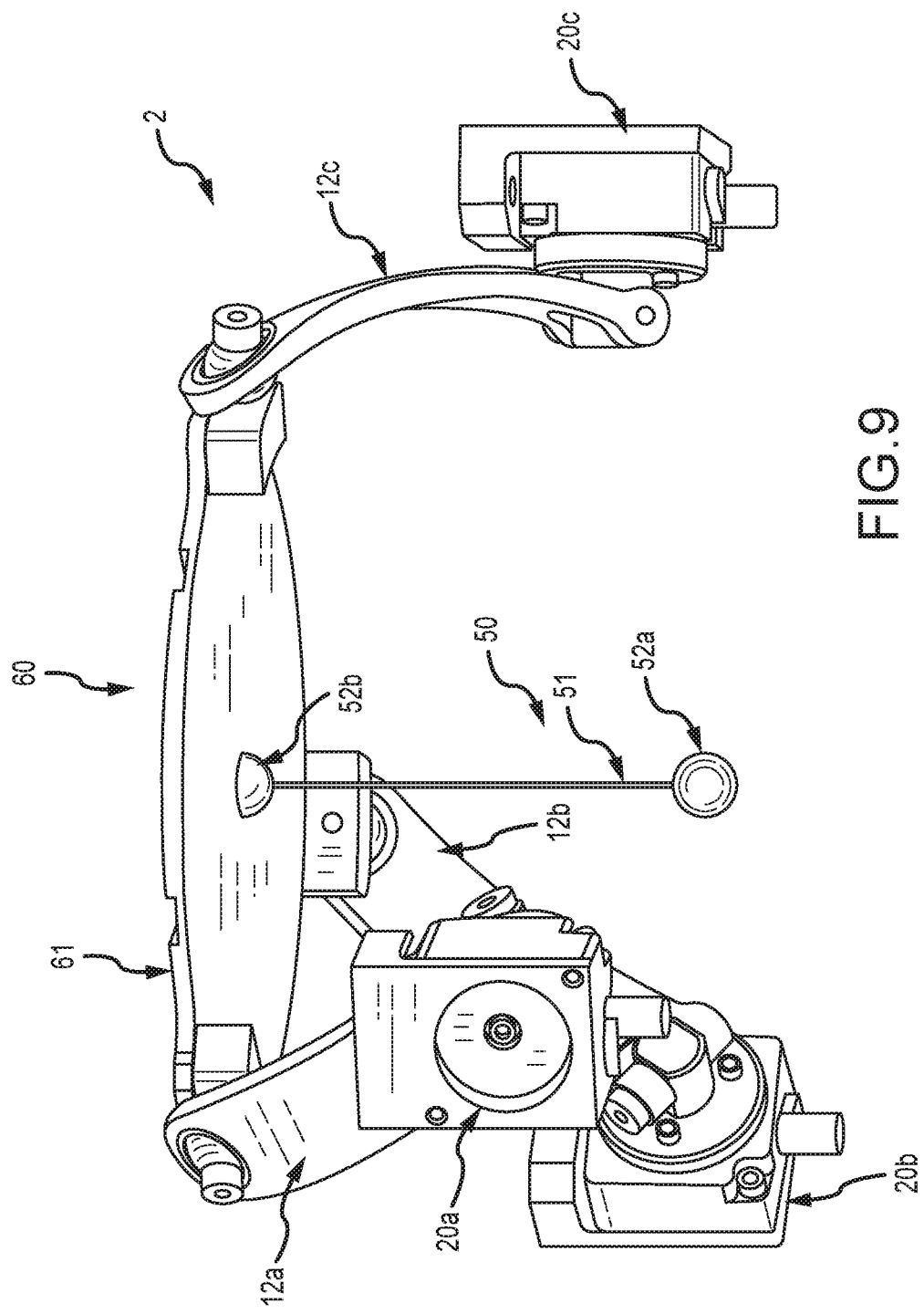
FIG. 9 is a perspective view of a thrust vector control mechanism according to one embodiment of the present disclosure.
Figure 10:
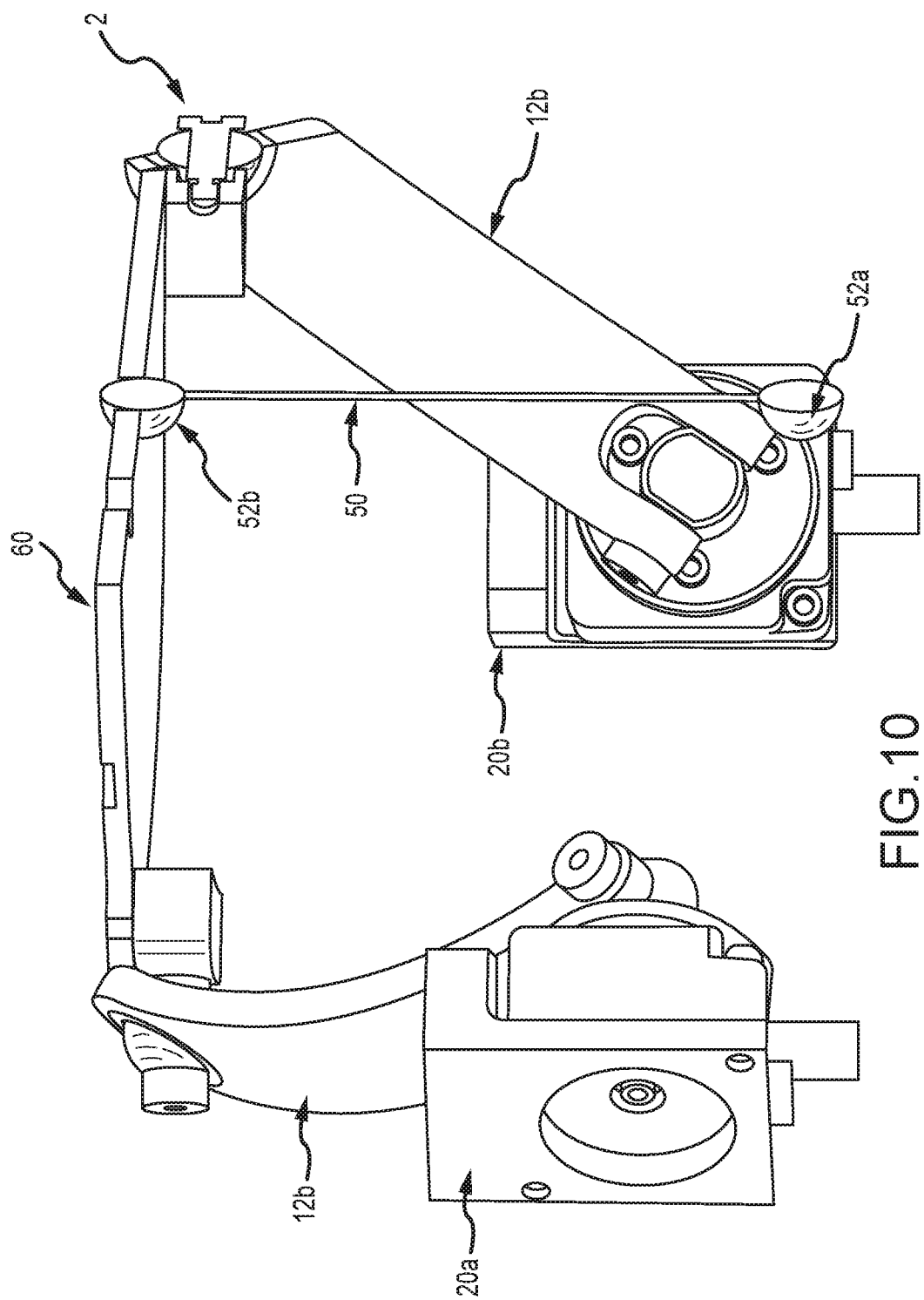
FIG. 10 is a perspective view of a section of a thrust vector control mechanism according to the embodiment of FIG. 9.
Figure 11:
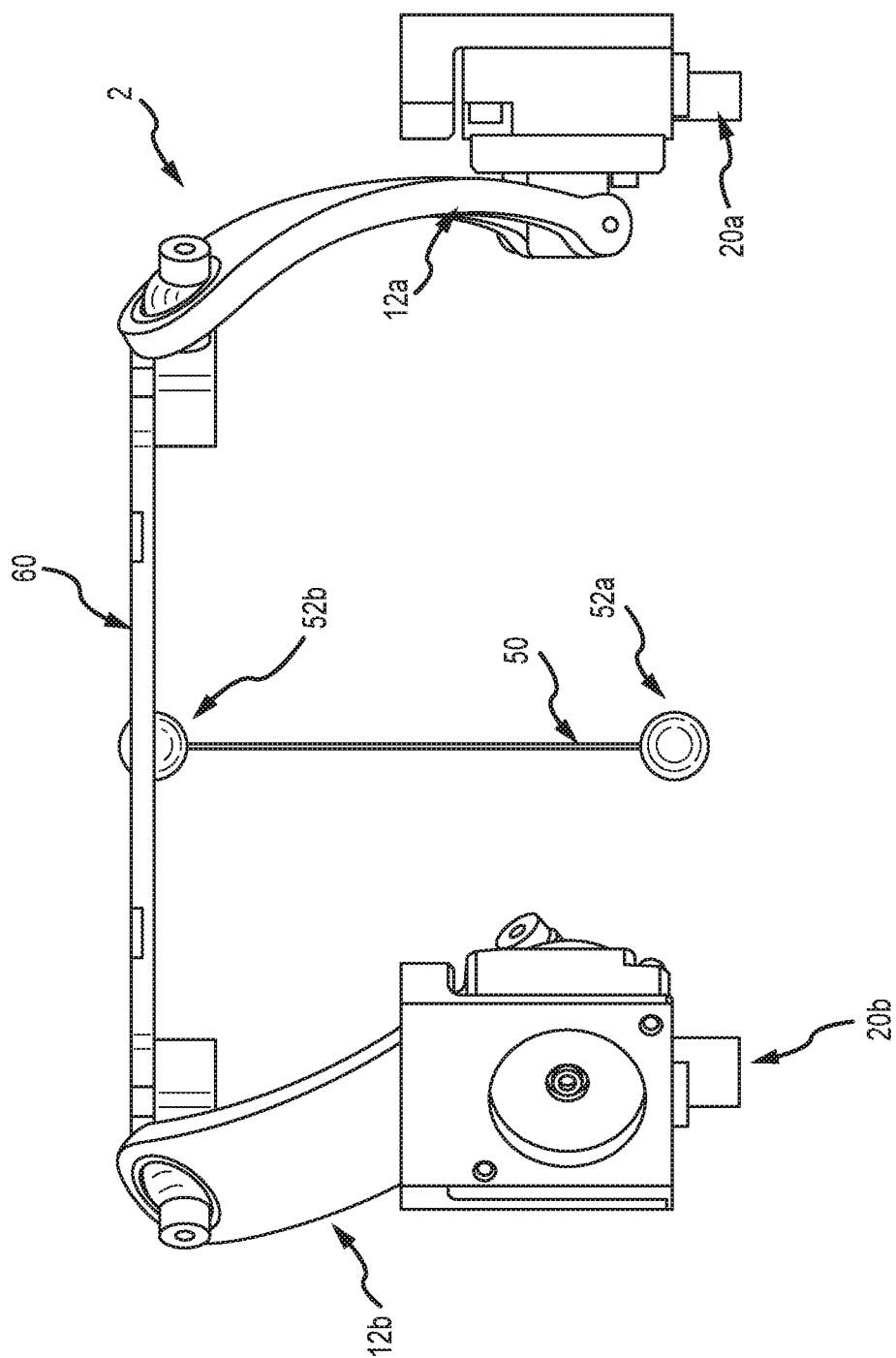
FIG. 11 is a perspective view of a section of a thrust vector control mechanism according to the embodiment of FIG. 9.
Figure 12:
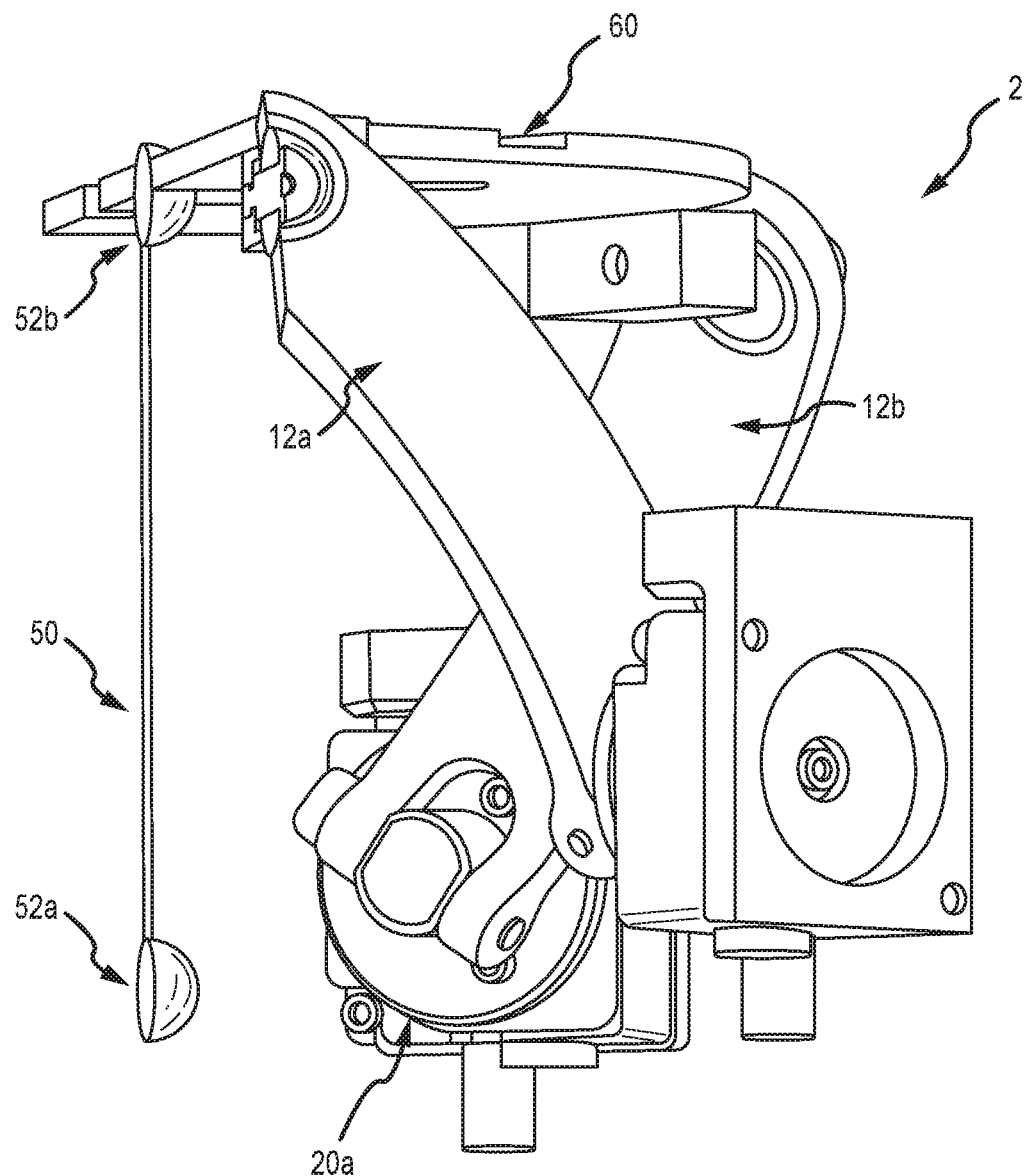
FIG. 12 is a perspective view of a section of a thrust vector control mechanism according to the embodiment of FIG. 9.
Figure 13:
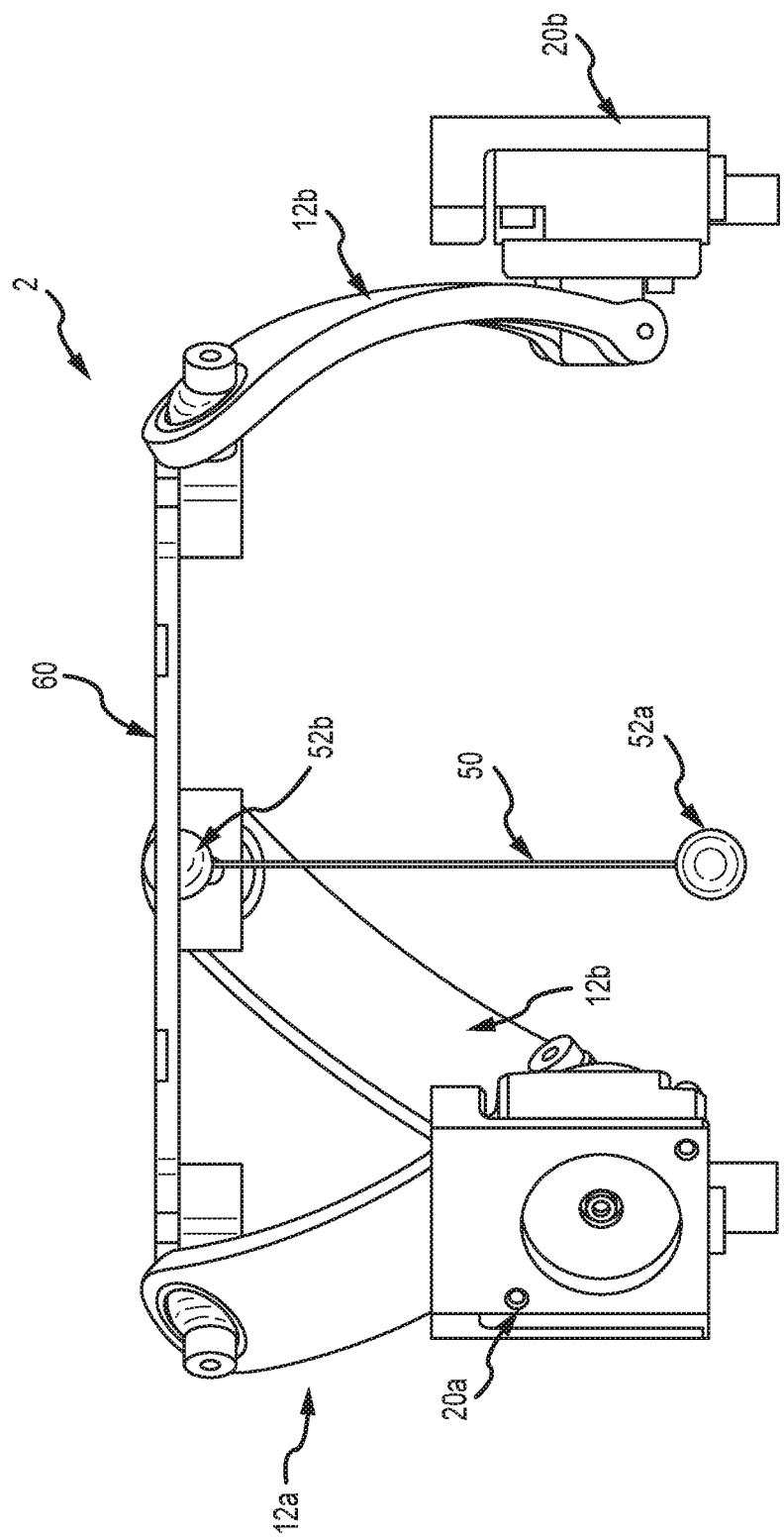
FIG. 13 is an elevation view of a section of a thrust vector control mechanism according to the embodiment of FIG. 9.

FIGS. 7-8 are top plan views of a thrust vector control mechanism 2 and a thruster body 4. As shown, a plurality of piezoelectric motors 20a, 20b, 20c are provided in one embodiment (FIG. 7) and a plurality of stepper motors 20a, 20b, 20c are provided in another embodiment (FIG. 8). The respective motors provide power and control to a linkage or system of support arms as shown.

FIGS. 9-13 depict a thrust vector control mechanism 2 according to one embodiment of the present disclosure. As shown, a pivotable linkage 50 is provided with the mechanism 2. The pivotable linkage 50 comprises spherical pivots 52a, 52b secured to a cable 51 or similar tensile member. The linkage 50 comprises a limiter for movement of the mechanism and a centering force that allows the mechanism 2 to be provided with a fourth attachment that is out of plane from the support arms 12a, 12b, 12c. The plate 60 further comprises a support and receiving member to which a thruster can be secured.

In some embodiments, the linkage 50 comprise a substantially inelastic member, such as a steel cable 51. Alternatively, it is contemplated that the linkage 50 comprises an elastic member in addition to or in lieu of an inelastic member. For example, it is contemplated that a coil spring is provided instead of or in addition to a cable. The second spherical pivot 52b is rotatably secured to the plate 60, and the first spherical pivot 52a is secured to a host object (e.g. a spacecraft chassis).

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention.

What is claimed is:

1. A thrust vector control mechanism comprising:
   a plurality of support arms, wherein each of the plurality of support arms comprises a first end and a second end;
   an actuator in communication with each of the plurality of support arms;
   a bearing assembly provided at or proximal to the second end of each of the plurality of support arms;
   a thruster body;
   each of the plurality of support arms in communication with the thruster body, and wherein the thruster body is rotatable relative to each of the support arms and translatable relative to the actuator.

2. The thrust vector control mechanism of claim 1, wherein the plurality of support arms comprises three support arms.

3. The thrust vector control mechanism of claim 1, wherein each of the plurality of support arms comprises at least one of a curved and an angled support arm.

4. The thrust vector control mechanism of claim 1, further comprising a frame member.

5. The thrust vector control mechanism of claim 4, wherein an axle extends through the frame member and wherein the axle is connected to the actuator.

6. The thrust vector control mechanism of claim 1, wherein the actuator comprises an electric motor.

7. The thrust vector control mechanism of claim 1, wherein the mechanism is connected to a chassis of at least one of a projectile and a spacecraft.

8. A control mechanism comprising:
   first, second and third support arms, wherein each of the support arms comprises a first end and a second end;
   an actuator provided in communication with at least one of the first, second and third support arms and wherein the actuator is operable to cause a rotation of at least one of the first, second and third support arm;
   a bearing assembly provided at or proximal to the second end of each of the support arms;
   a central body member in communication with the second ends of the first, second and third support arms; and
   wherein the central body member is rotatable relative to each of the support arms and translatable relative to the actuator.

9. The control mechanism of claim 8, wherein each of the support arms comprises at least one of a curved and an angled support arm.

10. The control mechanism of claim 8, wherein the central body member comprises a plate that is operable to receive at least one additional component.

11. The control mechanism of claim 8, further comprising a frame member.

12. The control mechanism of claim 11, wherein an axle extends through the frame member and wherein the axle is connected to the actuator.

13. The control mechanism of claim 8, wherein the actuator comprises an electric motor.

14. The control mechanism of claim 8, wherein the control mechanism is connected to a chassis of at least one of a projectile and a spacecraft.

15. A control mechanism comprising:
   first, second and third support arms, wherein each of the support arms comprises a first end and a second end;
   wherein the first end of each of the first, second and third support arms is connected to a frame member;
   an actuator provided in communication with at least one of the first, second and third support arms and wherein the actuator is operable to receive inputs from a controller and cause a rotation of at least one of the first, second and third support arms;
   a bearing assembly provided at or proximal to the second end of each of the support arms;
   a central body member in communication with the bearing assemblies; and
   wherein the central body member is rotatable relative to each of the support arms and translatable relative to the frame.

16. The control mechanism of claim 15, wherein each of the support arms comprises at least one of a curved and an angled support arm.

17. The control mechanism of claim 15, wherein the central body member comprises a plate that is operable to receive at least one additional component.

18. The control mechanism of claim 15, wherein the central body member comprises an ion thruster.

19. The control mechanism of claim 15, wherein the actuator comprises an electric motor.

20. The control mechanism of claim 15, wherein the control mechanism is connected to at least one of a projectile and a spacecraft.

* * * * *